United States Patent [19]

Hardin, Jr. et al.

[11] Patent Number: 4,749,541

[45] Date of Patent: Jun. 7, 1988

[54] POSITION SENSING MECHANISM FOR A NUCLEAR FUEL TRANSFER SYSTEM

[75] Inventors: Roy T. Hardin, Jr., Unity Township, Westmoreland County; James R. Marshall, Penn Hills Township, Allegheny County, both of Pa.

[73] Assignee: Westinghouse Electric Corp., Pittsburgh, Pa.

[21] Appl. No.: 938,662

[22] Filed: Dec. 5, 1986

[51] Int. Cl.[4] .................................................. G21C 19/00
[52] U.S. Cl. .................................... 376/261; 376/258; 340/686; 414/146
[58] Field of Search .............. 376/261, 260, 258, 262, 376/264, 270; 116/230; 33/645; 200/61.41, 61.42, 61.43, 64.44; 340/988, 686, 679, 673, 689; 414/401, 402, 584, 146

[56] References Cited

U.S. PATENT DOCUMENTS

| | | | |
|---|---|---|---|
| 3,206,366 | 9/1965 | Bosshard | 414/146 |
| 3,217,307 | 11/1965 | Fogelquist | 340/686 |
| 3,226,977 | 1/1966 | Kolb | 73/769 |
| 3,512,281 | 5/1970 | Hadjidakis | 340/686 |
| 3,594,740 | 7/1971 | Comeau et al. | 340/188 |
| 3,637,096 | 12/1972 | Crate | 414/146 |
| 3,905,011 | 9/1975 | Nichols | 340/686 |
| 3,906,442 | 9/1975 | Mosteller | 340/61 |
| 3,940,577 | 2/1976 | Christofer | 414/146 |
| 3,955,692 | 5/1976 | Cody et al. | 376/260 |
| 4,023,756 | 5/1977 | Baker | 248/59 |
| 4,053,067 | 10/1977 | Katz et al. | 414/146 |
| 4,069,766 | 1/1978 | Bernstein | 376/264 |
| 4,228,864 | 10/1980 | Berger et al. | 376/260 |
| 4,288,290 | 9/1981 | Saima et al. | 376/260 |
| 4,292,133 | 9/1981 | Sasaki et al. | 376/260 |
| 4,314,243 | 2/1982 | Phelps | 340/686 |
| 4,487,741 | 12/1984 | Vuckovich et al. | 376/271 |
| 4,513,953 | 4/1985 | Molders et al. | 267/121 |
| 4,542,373 | 9/1985 | Hillock | 340/568 |
| 4,649,016 | 3/1987 | Hardin, Jr. | 376/261 |

FOREIGN PATENT DOCUMENTS 0036636 8/1986 Japan .................................... 376/260

Primary Examiner—David H. Brown
Assistant Examiner—Daniel Wasil
Attorney, Agent, or Firm—D. C. Abeles

[57] ABSTRACT

A position sensing mechanism, for use with a nuclear fuel transfer system which employs an underwater cart having a pivotable container to receive fuel assemblies, employs mechanical elements below water and a cable which carries movement of the mechanical elements to a switch assembly at a dry location. The mechanical elements include an anchor element which is affixed to an upender mechanism, which selectively moves the container between horizontal and upended positions when the cart is located at a fuel transfer station, and a feeler mechanism which is displaced by the cart. The feeler mechanism includes a pivotably mounted swing arm and one or more pulleys. The cable is attached to the anchor elements and is guided by the pulleys. The switch assembly includes a further pulley having cams to actuate microswitches when the cable is displaced by the anchor element and feeler mechanism. A temperature compensator is spliced into the cable to keep its length constant despite temperature variations.

20 Claims, 7 Drawing Sheets

POSITION SENSING MECHANISM FOR A NUCLEAR FUEL TRANSFER SYSTEM

BACKGROUND OF THE INVENTION

The present invention is directed to a position sensing mechanism for a fuel transfer system in a nuclear power plant, and more particularly to a position sensing mechanism which avoids submerged electrical components even though the fuel is transferred under water.

A typical pressurized water reactor 10 is illustrated schematically in FIG. 1, and includes a reactor vessel 12 which contains nuclear fuel, a coolant (water) which is heated by the nuclear fuel, and means for monitoring and controlling the nuclear reaction. The reactor vessel 12 is cylindrical, and is provided with a permanent hemispherical bottom and a removable hemispherical lid 14. Hot water is conveyed from and returned to vessel 12 by a reactor coolant system which includes one or more reactor coolant loops 16 (usually 2, 3, or 4 loops, depending upon the power-generating capacity of the reactor, but only one loop 16 is illustrated in FIG. 1). Each loop 16 includes a pipeline to convey hot water from the reactor vessel 12 to a steam generator 18, a pipeline to convey the water from steam generator 18 back to the reactor vessel 12, and a pump 20. The steam generator 18 is essentially a heat exchanger which transfers heat from the reactor coolant system to water received at inlet 22 from a source that is isolated from the reactor coolant system; the resulting steam is conveyed via outlet 24 to a turbine (not illustrated) to generate electricity. During operation of the reactor 10, the water within vessel 12 and the reactor coolant system is maintained at a controlled high pressure by pressurizer 26 to keep it from boiling as it is heated by the nuclear fuel.

Nuclear fuel is supplied to reactor in the form of fuel assemblies 28 which are supported by a core plate 30 within vessel 12. There are a number of such fuel assemblies 28 within vessel 12, although only two are illustrated in the drawing. Each fuel assembly includes a base element and a bundle of fuel rods and tubular guides which are supported on the base element. The fuel rods have cylindrical housings which are filled with pellets of fissionable material enriched with U-235. The tubular guides accommodate measuring instruments and movably mounted control rods of neutron-moderating material. A typical fuel assembly for a pressurized water reactor is about 4.1 meters long, has a square cross section that is about 19.7 centimeters per side, and has a mass of about 585 Kg. A typical four loop reactor might contain about 200 such fuel assemblies.

As a safety measure, reactor 10 is enclosed within a containment building 32. Vessel 12 is disposed in a well 34 which can be flooded with water, and the well communicates via a sealable tunnel 36 with a fuel storage building 38 having pools of water for storing fresh and used fuel. Rails 40 extend through tunnel 36 to support a cart 42 which carries fresh fuel assemblies from building 38 to vessel 12 and which returns spent fuel assemblies from vessel 12 to building 38. Cart 42 includes a pivotably mounted fuel container 44 which accommodates one fuel assembly 28.

After a service life of several years in vessel 12, the U-235 enrichment of a fuel assembly 28 is depleted. During a refueling operation, the reactor 10 is shut down, the pressure within vessel 12 is relieved, well 34 and tunnel 36 are flooded with water, and the lid 14 of vessel 12 is removed. Cart 42 is moved to a location adjacent vessel 12 and container 44 is pivoted from the horizontal position to the vertical or upended position. By remote control a spent fuel assembly 28 is removed from vessel 12 and inserted into the awaiting container 44, which is then pivoted back to the horizontal position. Cart 42 is then moved through tunnel 36 to building 38, where container 44 is again pivoted to the upended position and the spent fuel assembly 28 is transferred by remote control to a spent fuel storage pool (not illustrated) containing water with dissolved boron salts to moderate the neutron flux. A fresh fuel assembly 28 is then loaded into cart 42 for carriage back to vessel 12 and transfer thereto. Such exchanges are repeated until a predetermined number of spent fuel assemblies have been replaced by fresh ones, whereupon lid 14 is re-installed, the water is drained from well 34, tube 36 is seals, and power generation begins anew. Typically there are several such refueling operation during the time a single fuel assembly 28 resides in vessel 12, since vessel 12 includes fuel assemblies 28 at various stages of depletion.

Cart 42 is driven back and forth along rails 40 by an endless chain (not illustrated) that is powered by a motor (not illustrated) positioned above the level of the water. Sensors (not illustrated) are needed in transfer stations at both the fuel-storage side of tunnel 36 and at the containment-building side to determine when cart 42 has reached the location for a fuel transfer, and thus when to stop the motor. Further sensors are needed on each side to determine when container 44 is in the upended position and when it is in the horizontal position. The sensors must, of course, be highly reliable. Furthermore the environment is a harsh one, since cart 42 is under many feet of water when the sensing operations are needed.

SUMMARY OF THE INVENTION

Accordingly, an object of the invention is to provide a position sensing mechanism which senses the position of an object in a harsh environment without exposing electrical sensing elements to the harsh environment.

Another object of the invention is to provide a position sensing mechanism for use with a fuel transfer system in a nuclear power plant, the sensing mechansim employing mechanical elements which are mounted under water and means for transferring motion of these elements to an electrical position sensor mounted above the water.

Another object of the invention is to provide a position sensing mechanism which employs a cable to transfer movement from mechanical elements positioned below water to a position sensor located above water, with a temperature compensator being provided to keep the length of the cable substantially constant.

Another object of the present invention is to provide a position sensing mechanism which signals whether a cart having a pivotable fuel container is present at a flooded transfer station and whether the container is in a horizontal or upended position, using a temperature compensated cable that is connected between the flooded transfer station and an electrical position sensor which is mounted at a dry location.

These and other objects which will become apparent are attained, in a nuclear fuel transfer system which includes a cart having a pivotably mounted fuel container which is movable between a horizontal position and an upended position, guide means such as rails for guiding the cart along a path which leads to a floodable fuel transfer station, and an upender mechanism at the fuel transfer station for engaging the container when the cart is at a predetermined location and for selectively moving the container between the horizontal and upended positions, by providing mechanical elements at the transfer station, an electrical position sensor mounted at a dry location above the transfer station, and means such as a cable for transferring mechanical motion from the submerged mechanical elements to the position sensor. The mechanical elements include a feeler mechanism disposed at the transfer station at a position to engage the cart, the feeler mechanism being movable between a first position when the cart is located at the predetermined position and a second position when the cart is not located at the predetermined position, and an anchor element which is operatively connected to the upender mechanism.

DESCRIPTION OF THE PREFERRED EMBODIMENT

Figure 2:
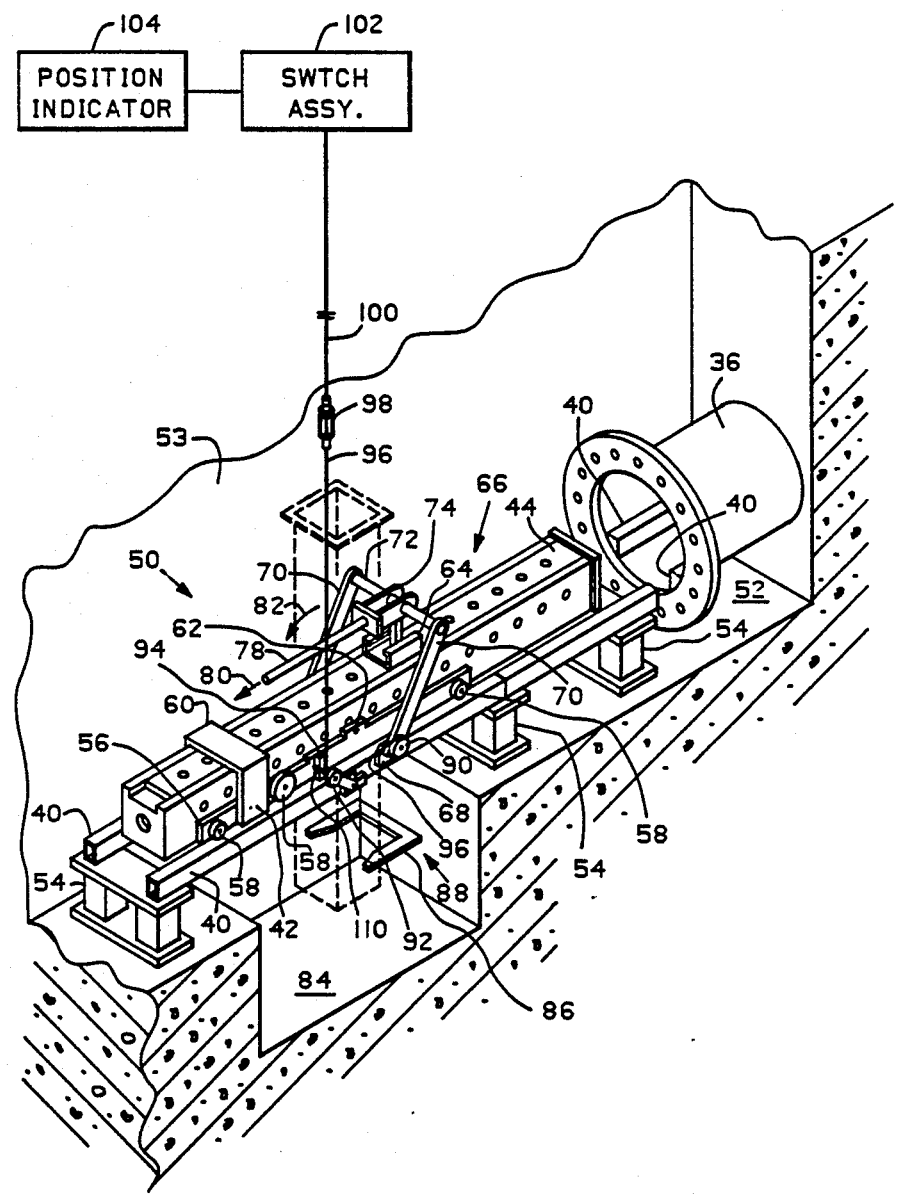
FIG. 2 is a perspective view, partially in section and partially broken away, illustrating an embodiment of the position sensing mechanism of the present invention employed at a fuelt ransfer station located at the containment-building end of the transfer path.

FIG. 2 illustrates a floodable transfer station 50 at the containment-building side of tunnel 36, which is provided by a large diameter pipe. Rails 40 are affixed within tunnel 36 and, outside of tunnel 36, are supported above floor 52 at a position adjacent wall 53 by mounting platforms 54. Cart 42 includes a pair of side members 56 (only one of which is illustrated in FIG. 2) on which wheels 58 are rotatably mounted. A brace 60 is affixed to each of the side members 56. Shafts 62 (only one of which is illustrated) are affixed to open-mouthed fuel container 44 and extend through members 56 to pivotably mount container 44 between members 56. A slotted bracket 64 is affixed to container 44.

Figures 1, 4:
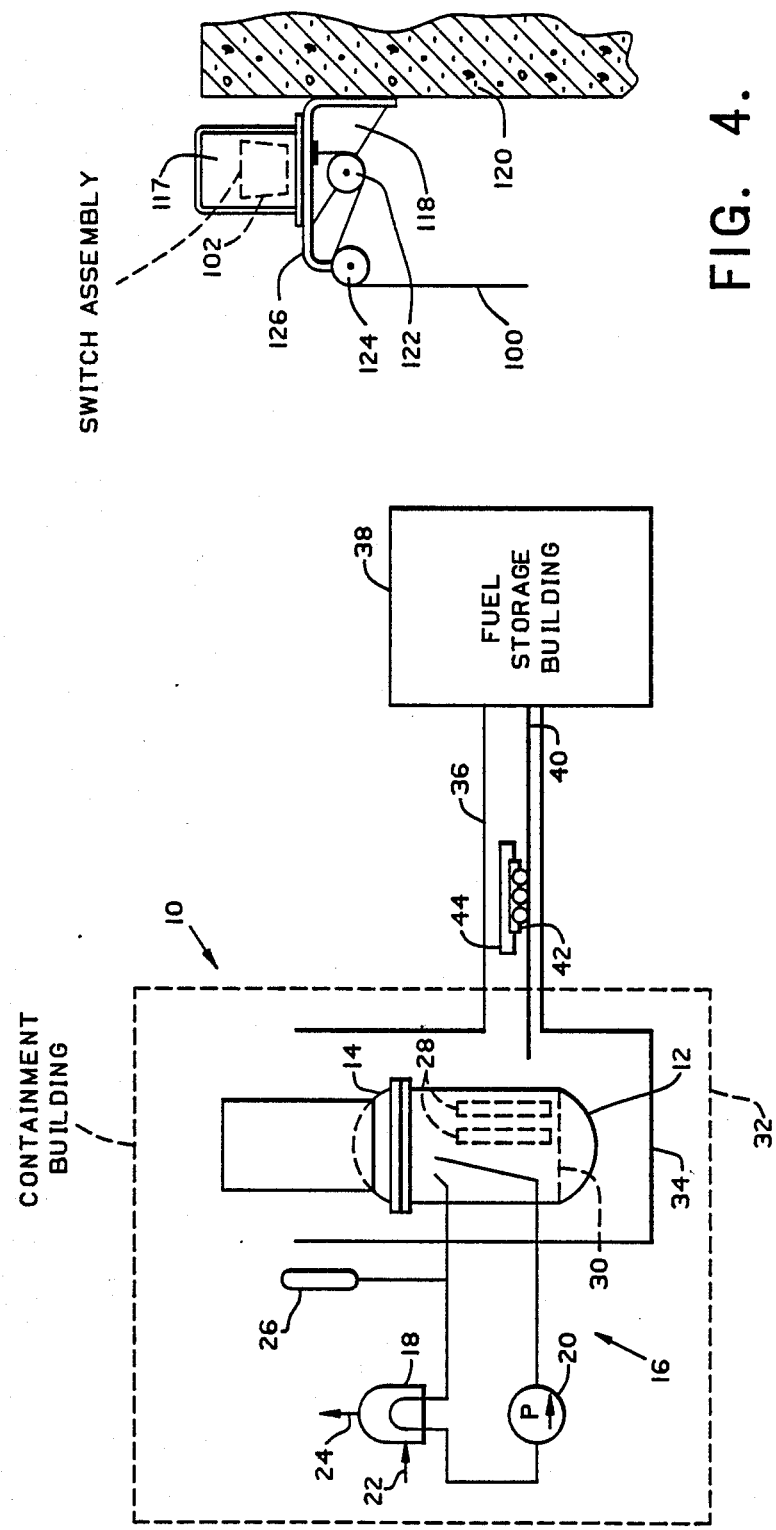
FIG. 1 schematically illustrates a typical nuclear reactor and fuel transverse system.
FIG. 4 is a side view, partially in section, schematically illustrating the housing for a switch assembly positioned above the water level.

Transfer station 50 includes an upender mechanism 66 which engages bracket 64, when cart 42 is properly positioned in station 50, and pivots it from the horizontal position shown in solid lines in FIG. 2 to the upended position shown in dotted lines. Upender mechanism 66 includes flanges 68 affixed to the rails 40, arms 70 that are rotatably mounted on flanges 68, and rod 72 connected between arms 70. A bracket member 74, best seen in FIG. 3 (which, it should be noted, illustrates components at another transfer station located at the fuel-storage side of tunnel 36, rather than the containment-building side as in FIG. 2), includes a depending shoe 76 which is positioned to slide into bracket 64. Bracket member 74 is connected to a hydraulic cylinder (not illustrated) by a shaft 78. It will be apparent that, when shoe 76 is positioned within bracket 64 as illustrated in FIG. 2 and the hydraulic cylinder pulls shaft 78 in the direction of arrow 80, arms 70 rotate as indicated by arrow 82 to pivot container 44 into the upended position shown in dotted lines. During this pivoting movement the lower end of container 44 moves into a well 84 and is steadied by a bracket 86 mounted in well 84. In the upended position, a fuel assembly (not illustrated) may be withdrawn from container 44 for transfer to reactor vessel 12 (FIG. 1) and a fuel assembly from reactor 12 can be inserted into container 44 for transfer to fuel storage building 38 (FIG. 1). After the transfer is completed the hydraulic cylinder (not illustrated) is actuated to push shaft 78 in the direction opposite arrow 80 to return container 44 to the horizontal position.

Although the foregoing discussion has described a transfer station 50 at the containment-building side of tunnel 36, it will be apparent that there is a similar transfer station at the fuel-storage side of tunnel 36.

With continuing reference to FIG. 2, the position sensing mechanism 88 of the present invention includes a first pulley 90, a swingably mounted second pulley 92 which is positioned to engage an abutment 94 affixed to cart 42, a cable 96 segment which extends from pulleys 90 and 92 to temperature compensator 98, a cable segment 100 which extends between compensator 98 and an out-of-water sensing mechanism such as switch assembly 102, and a position indicator 104 that is electrically connected to assembly 102. Cable segments 96 and 100 will occasionally be referred to collectively hereafter as simply "the cable."

Figure 3:
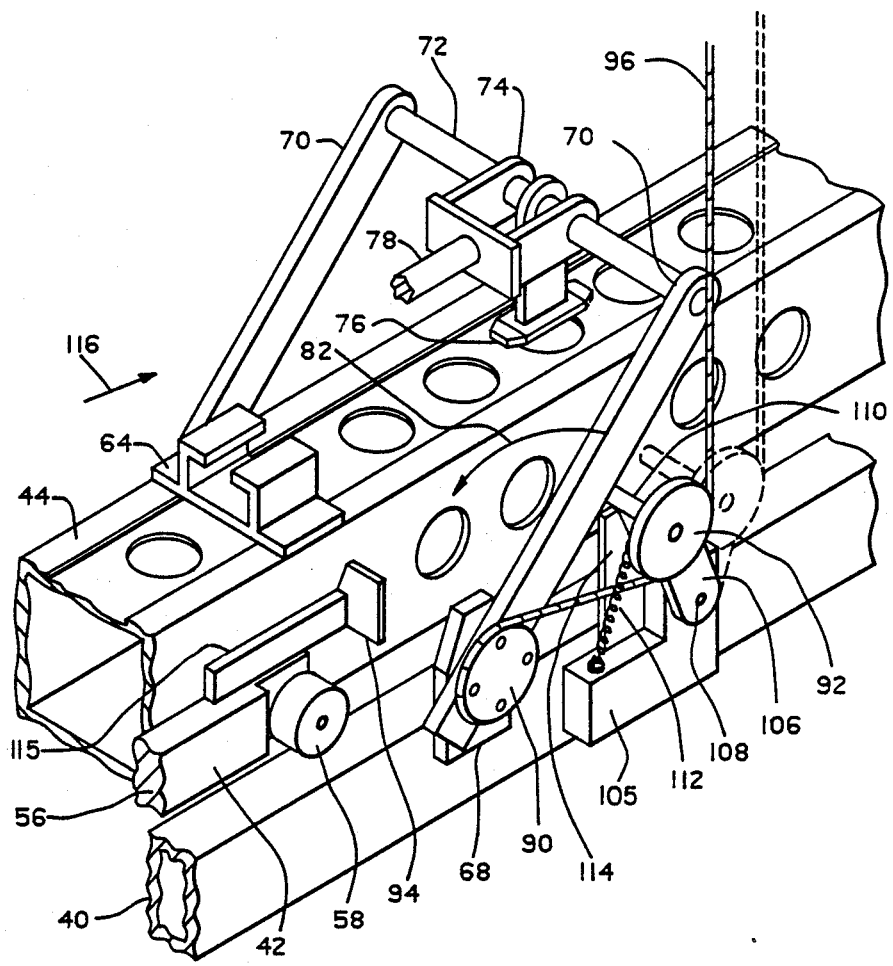
FIG. 3 is a perspective view, partially broken away, illustrating the lower portion of the position sensing mechanism at the fuel-storage end of the transfer path.

Turning next to FIG. 3, mounting block 105 is affixed to rail 40. The lower end of swing arm 106 is pivotably mounted to a shaft 108 extending from block 105. Pulley 92 is rotatably mounted on a feeler shaft 110, which is affixed to the upper end of arm 106. A spring 112 normally biases arm 106 so that shaft 110 rests against a stop 114. Shaft 110 is positioned for engagement with abutment 94, which is mounted on an arm 115 that is affixed to side member 56.

Pulley 90 is affixed to arm 70 and is not rotatable with respect thereto. Cable segment 96 is affixed to the periphery of pulley 90 and loops around pulley 92.

With continuing reference to FIG. 3, cart 42 approaches feeler shaft 110 in the direction indicated by arrow 116. When abutment 94 reaches shaft 110, it begins pressing shaft 110 and thus arm 106 in the clockwise direction. This causes a tub on cable segment 96. Further motion in the direction of arrow 116 causes arm 106 to rotate to the position illustrated in dotted lines, thereby pulling cable segment 96 further downward. At this point shoe 76 has engaged bracket 64, and the forward motion of cart 42 is stopped. The hydraulic cylinder (not illustrated) is then actuated to pull shaft 78 and thereby rotate container 44 to the upended position. As this occurs pulley 90 rotates and pulls cable segment 96 further downward. When the upender reaches the vertical position, it engages a stopping element (not illustrated). Container 44 is held in the upended position while a fuel assembly (not illustrated) is loaded or removed. After this the hydraulic cylinder is actuated to return container 44 to the horizontal position, with cable segment 96 moving upward as this occurs. After a predetermined upward movement of the cable container 44 has achieved the horizontal position, whereupon the operator moves cart 42 out of the transfer station in the direction opposite arrow 116. As will be discussed, the displacement of the cable is used to provide signals which tell the operator when cart 42 is present in the transfer station 50 (FIG. 2) and when container 44 is oriented in its horizontal or upended positions.

It should be noted that pulley 92 is illustrated to the right of pulley 90 in FIG. 3 and to the left of pulley 90 in FIG. 2. The reason for this is that the transfer station 50 illustrated in FIG. 2 is positioned at the containment-building side of tunnel 36, while the elements illustrated in FIG. 3 are positioned at the second transfer station on the fuel-storage side of the transfer tunnel.

Turning next to FIG. 4, switch assembly 102 is housed in an enclosure 117 mounted on a wall 120 by bracket 118. Pulley 122 is rotatably mounted on bracket 118, and pulley 124 is rotatably mounted on a leg 126 extending outward from bracket 118. Cable segment 100, which loops around pulleys 122 and 124, extends into enclosure 117.

Figure 5:
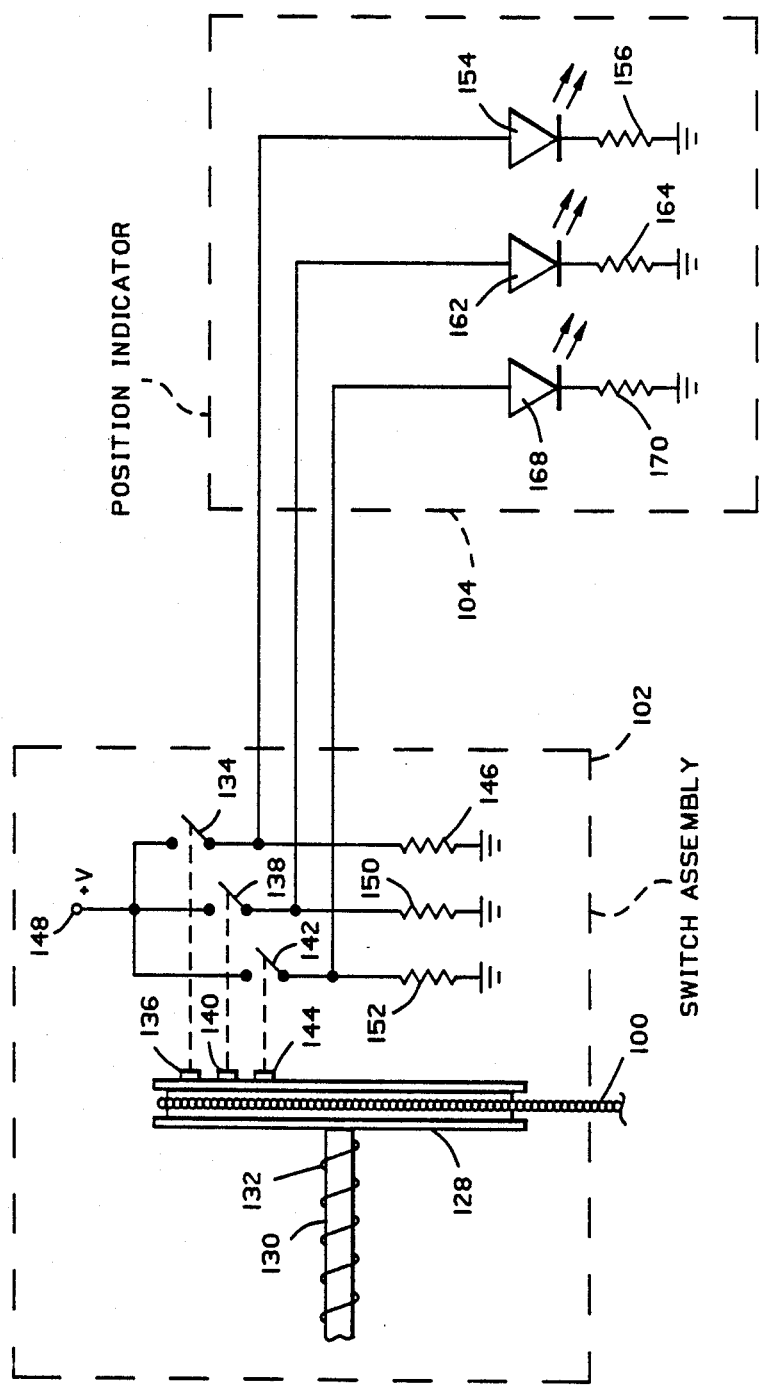
FIG. 5 schematically ilustrates the operation of the switch assembly and a position indicator.

Referring next to FIG. 5, switch assembly 102 includes a pulley 128 which is affixed to a rotatably mounted shaft 130. The end of cable segment 100 is secured to the periphery of pulley 128. Spring 132 biases pulley 128 to keep cable 100 taunt. A first microswitch 134 is positioned for actuation by a corresponding first cam 136 affixed to the face of pulley 128; a second microswitch 138 is positioned for actuation by a corresponding second cam 140 affixed to the face of pulley 128; and a third microswitch 142 is positioned for actuation by a corresponding third cam 144, which is also affixed to the face of pulley 128. Electrically, switch 134 is connected in series with pull-down resistor 146 between ground and a power supply terminal 148, which supplies a positive voltage. Similarly, switch 138 is connected between terminal 148 and pull-down resistor 150, and switch 142 is connected between terminal 148 and pull-down resistor 152.

Switches 134, 138, and 142 provide signals for position indicator 104, which tells the operator whether cart 42 is present at transfer station 50, and whether container 44 is in either the horizontal position or the upended position. An example of how this can be accomplished is illustrated in FIG. 5. A light emitting element such as LED 154 is connected between switch 134 and current-limiting resistor 156, which in turn is connected to ground. Cam 136 closes switch 134 as cart 42 (FIG. 2) enters station 50 and is configured as an elongated arc in order to keep switch 134 closed until cart 42 subsequently leaves station 50. Switch 138 is connected to LED 162, which is connected to ground through current-limiting resistor 164. Cam 140 is positioned to close switch 138 at the same time switch 136 is initially closed, but cam 140 is not elongated and thus permits switch 138 to be open unless container 44 (FIG. 2) is in its horizontal position. Switch 142 is connected to LED 168, which in turn is connected to ground through current-limiting resistor 170. Cam 144 closes switch 142 only when the container is in the upright position.

With reference next to both FIGS. 2 and 5, cart 42 enters transfer station 50 travelling to the left. When abutment 94 engages shaft 110, cables 96 and 100 are displaced downward, thereby rotating pulley 128 so that cam 136 closes switch 134 and cam 140 closes switch 138. This illuminates LED's 154 and 162, which indicates to the operator that cart 42 has reached the transfer position and that container is in the down position. The operator then actuates upender mechanism 66, which rotates pulley 90 to withdraw still more cable. Cam 140 opens switch 138 at the start of travel, and LED 162 stops emitting light. Cam 144 rotates into position to close microswitch 142 when container 44 has attained the upended position, so that transfer of a fuel assembly can begin. Upon completion of the transfer the operator again actuates the hydraulic cylinder, whereupon switch 142 is opened as upender mechanism 66 returns container 44 to the horizontal position. When the horizontal position is attained LED 162 is turned ON to signal the operator that cart 42 can be moved out of transfer station 50. As it departs, switches 134 and 138 are opened again by cam 136 and cam 140, and LEDs 154 and 162 turn OFF.

Figure 6:
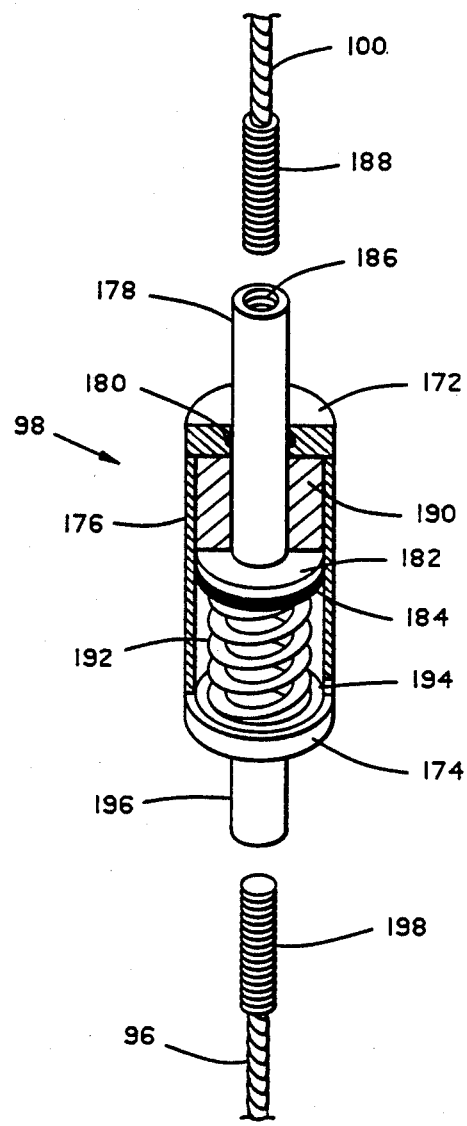
FIG. 6 is a sectional view of a temperature compensator that is connected to the cable leading to the switch assembly.

Turning next to FIG. 6, temperature compensator 98 is provided to keep the total length of cable segments 96 and 100 substantially constant regardless of variations in temperature. In FIG. 6, end caps 172 and 174 are affixed to hollow cylinder 176. Piston rod 178 slidably extends through an opening in cap 172, in which a piston rod seal 180 is mounted. The lower end of rod 178 is affixed to a piston 182, on which a piston seal 184 is mounted. The upper end of rod 178 has a threaded opening 186 for receiving a threaded element 188 attached to cable segment 100. A thermally sensitive plastic or wax element 190 is disposed within cylinder 176 between piston 182 and cap 172. A spring 192 is enclosed in cylinder 176 between piston 182 and cap 174. A vent 194 permits fluid communication between the exterior and the cavity in which spring 192 is located. One end of a rod 196 is affixed to cap 174 and the other end has a threaded opening (not illustrated) to receive threaded element 198, to which cable segment 96 is affixed. It will be apparent that element 190 expands as the temperature increases, thereby reducing the distance between rods 178 and 196 to compensate for thermal expansion of the cable. As a result the total length of cable segments 96 and 100 remains substantially constant, so that the position of pulley 128 (FIG. 5) is insensitive to temperature variations.

Figure 7:
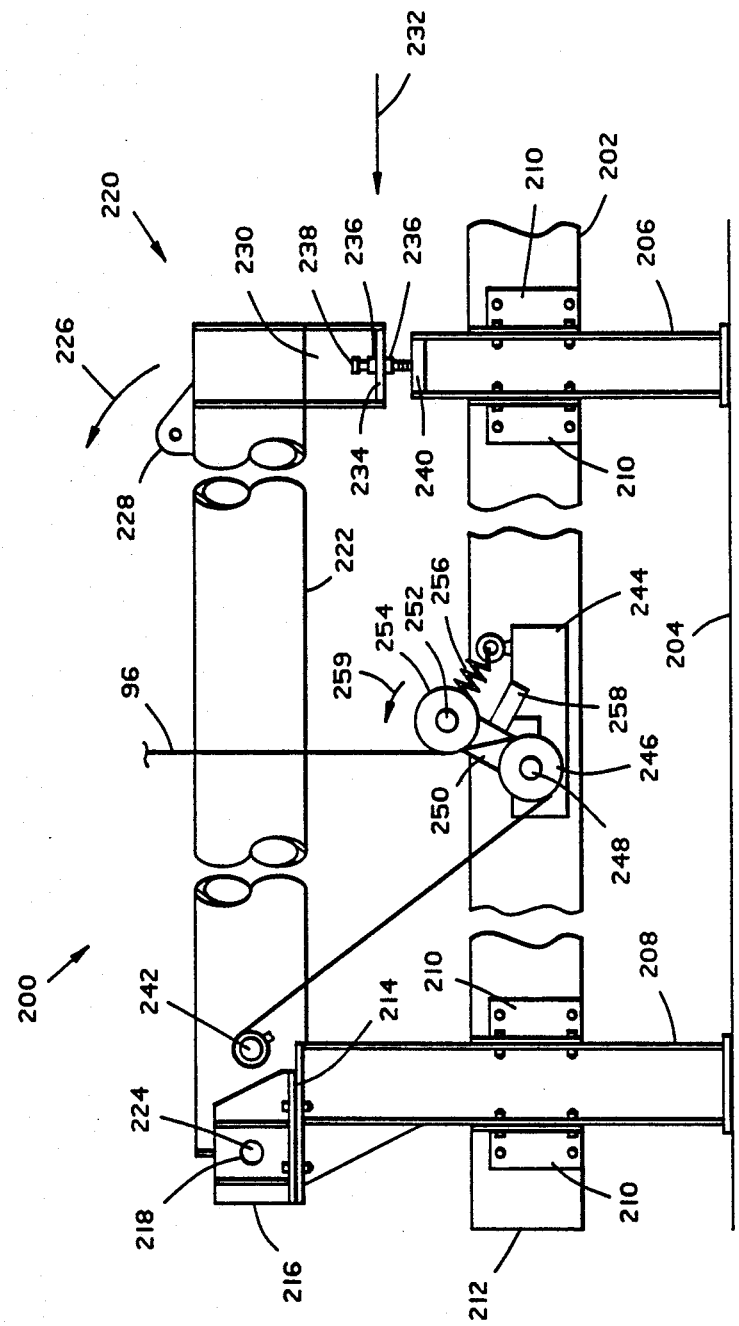
FIG. 7 is a side view schematically illustrating the lower portion of a modified embodiment of the position sensing mechanism, employed at a transfer station at the containment-building end of the transfer path.
Figure 8:
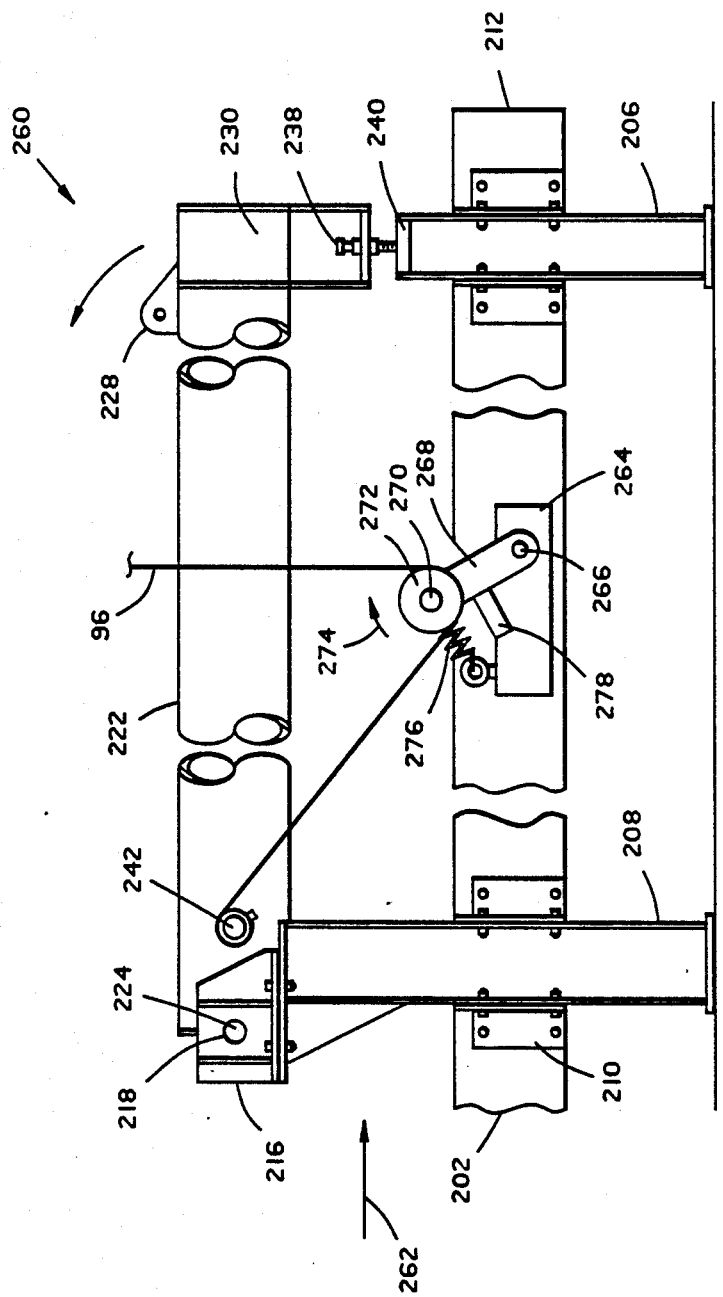
FIG. 8 is a side view schematically illustrating the lower portion according to the modified embodiment employed at a transfer station at the fuel-storage end of the transfer path.

FIGS. 7 and 8 illustrate a modification of the lower portion of the invention when it is used with a modified upender mechanism and modified cart that are occasionally encounter at nuclear power stations. While cart 42 in FIG. 2 has a fuel container 44 that is hinged (by shafts 62) in the central region of container 44, the modified cart (not illustrated) is hinged at one end much in the manner of a dump truck. Furthermore cart 42 is provided with a centrally located bracket 64 for engaging upender mechanism 66, but the modified cart has engagement means near the end opposite the hinged end. Specifically, the engagement means comprises slots in the fuel container of the modified cart.

FIG. 7 illustrates a transfer station 200 at the containment-building end of tunnel 36 (FIG. 1). A pair of rail-mounting beams 202 (only one of which is illustrated) are supported above floor 204 of station 200 by a pair of beams 206 (only one of which is shown) and a pair of beams 208 (only one of which is shown). On both the side that is illustrated in FIG. 7 and the unseen side, brackets 210 are bolted to beams 202 and beams 206 and 208. Beams 208, which are provided adjacent the end 212 of rail-mounting beams 202, extend upwardly to flanges 214 on both sides. Furthermore on both sides hinge plates 216 having hinge openings 218 are bolted to plates 216.

Upender mechanism 220 includes a pipe 222 to which studs 224 (only one of which is shown) are mounted. Studs 224 extend through hinge openings 218 to pivotably mount pipe 222. At its other end pipe 222 is provided with an eye member 228 which secures a cable (not illustrated) for lifting and pivoting pipe 222 as indicated by arrow 226. Mechanism 220 also includes a generally U-shaped saddle member 230 which is affixed to pipe 222 and which arches over the path provided by rail-mounting beams 202 in order to permit entry of a modified vehicle (not illustrated) travelling in the direction of arrow 232. On both sides plates 234 are secured to member 230, and nuts 236 mount bolts 238 to plates 234. When upender mechanism 220 is positioned as illustrated in FIG. 7, the lower ends of bolts 238 rest against plates 240 mounted at the upper ends of beams 206. Bolts 238, which are lifted from plates 240 when upender mechanism 220 is pivoted, permit saddle member 230 to be adjusted in height. This permits studs (not illustrated) mounted within member 230 to be positioned to engage the aforesaid slots (not illustrated) in the modified cart (not illustrated). It will be apparent that when the modified cart enters upender mechanism 220, the hinged end of the fuel container (not illustrated) is oriented toward end 212 and the unhinged end (not illustrated) latches onto member 230. Accordingly, when pipe 222 is pivoted as indicated by arrow 226, the fuel container is also pivoted.

The modified embodiment of the positioned sensing mechanism of the present invention includes a shaft 242 which is affixed to pipe 222 and which extends radially from pipe 222. The end of cable 96 is affixed to the periphery of shaft 242. A mounting block 244 is secured to beam 202, and pulley 246 is rotatably mounted on block 244 by shaft 248. The lower end of swing arm 250 is also pivotably mounted to shaft 248. Feeler shaft 252 is mounted at the upper end of arm 250, and pulley 254 is rotatably mounted on shaft 252. The ends of spring 256 are connected respectively to block 244 and arm 250 to bias arm 250 in the clockwise direction. A spacer bar 258 is secured to block 244 to limit the clockwise rotation of arm 250.

With continuing reference to FIG. 7, the modified cart (not illustrated) is provided with a centrally disposed projection (not illustrated) which comes into contact with feeler shaft 252 as the cart enters upender mechanism 220. This engagement rotates arm 250 in the direction of arrow 259, thereby tugging cable segment 96. This, as previously discussed, causes light emitting diodes 154 and 162 (see FIG. 5) to turn ON. Upender mechanism 220 is then rotated in the direction of arrow 226, and as this occurs cable segment 96 is wrapped around shaft 242, which is displaced counter-clockwise around studs 224. The further displacement of cable segment 96 causes LED 162 to turn OFF when the rotation of mechanism 220 begins and causes LED 168 to turn ON when the container (not illustrated) is in the upended position FIG. 8 illustrates a transfer station 260 at the fuel-storage end of tunnel 36 (FIG. 1). The modified cart (not illustrated) enters station 260 in the direction of arrow 262, with the hinged end of the container directed away from end 212. Because of this different orientation one of the pulleys illustrated in FIG. 7 can be omitted.

With continuing reference to FIG. 8, mounting block 264 is affixed to rail-mounting beam 202. Shaft 266 extends from block 264 to pivotably mount the lower end of swing arm 268. Feeler shaft 270 is mounted at the upper end of arm 268 and rotatably supports pulley 272. Shaft 270 is positioned to engage the modified cart (not illustrated) and thereby cause arm 268 and pulley 272 to rotate in the clockwise direction, as indicated by arrow 274. Spring 276 biases arm 268 in the counterclockwise direction, and bar 278 provides a stop.

It will be understood that the above description of the present invention is susceptible to various modifications, changes, and adaptations, and the same are intended to be comprehended within the meaning and range of equivalents of the appended claims.

What we claim is:

1. In a nuclear fuel transfer system which includes a cart having a pivotably mounted fuel container which is movable between a horizontal position and an upended position, guide means for guiding the cart along a path which leads to a floodable fuel transfer station, and upender means at the fuel transfer station for engaging the container when the cart is at a predetermined position and for selectively moving the container between the horizontal and vertical positions, a position sensing mechanism comprising:

a feeler mechanism disposed at said transfer station at a position to engage said cart, said feeler mechanism being movable between a first position and a second position when said cart is not located at the predetermined position;

an anchor element operatively connected to said upender means;

an electrical position sensor mounted at a dry location above said transfer station; and means for transferring mechanical motion of said feeler mechanism and said anchor element to said position sensor.

2. The position sensing mechanism of claim 1, wherein the feeler mechanism comprises a swing arm, means mounting the swing arm for pivoting movement, means for biassing the swing arm toward the second position, and a member extending from the swing arm to engage the cart.

3. The position sensing mechanism of claim 2, wherein the anchor element comprises a first pulley fixedly mounted on the upender means, wherein the feeler member further comprises a second pulley mounted on the swing arm, and wherein the means for transferring mechanical motion comprises a cable having an upper end which is connected to the electrical position sensor and a lower end which is affixed to the first pulley, the cable additionally being looped around the second pulley.

4. The position sensing mechanism of claim 3, wherein the electrical position sensor comprises switch means for detecting displacement of the cable.

5. The position sensing mechanism of claim 4, further comprising a temperature compensator spliced into the cable to keep the total length of the cable substantially constant despite temperature variations.

6. The position sensing mechanism of claim 5, wherein the temperature compensator comprises a hollow cylinder having upper and lower end caps, an upper rod which movably extends through the upper end cap, a lower rod which is attached to the lower end cap, means for attaching the cable to the upper and lower rods, a piston element disposed within the cylinder and attached to the upper rod, and material having a high thermal coefficient of expansion disposed between the piston element and said upper end cap.

7. The position sensing mechanism of claim 6, wherein said material between the piston element and the upper end cap is wax.

8. The position sensing mechanism of claim 6, wherein the material between the piston element and the upper end cap is plastic.

9. The position sensing mechanism of claim 6, further comprising a spring disposed between the piston element and the lower end cap.

10. The position sensing mechanism of claim 3, wherein the electrical position sensor comprises a rotatably mounted third pulley having cams mounted thereon, the cable being attached tot he periphery of the pulley, spring means for biassing the pulley, and microswitches positioned for actuation by the cams.

11. The position sensing mechanism of claim 4, wherein there are three cams and three microswitches, each microswitch engaging a respective one of the cams.

12. The position sensing mechanism of claim 2, wherein the anchor element comprises a shaft fixedly mounted on the upender means, wherein the feeler mechanism comprises a pulley mounted on the swing arm, and wherein the means for transferring mechanical motion comprises a cable having an upper end which is connected to the electrical position sensor and the lower end which is affixed to the shaft, the cable additionally being looped around the pulley.

13. The position sensing mechanism of claim 12, wherein the electrical position sensor comprises switch means for detecting displacement of the cable.

14. The position sensing mechanism of claim 2, wherein the anchor element comprises a shaft fixedly mounted on the upender means, wherein the feeler member comprises a first pulley mounted on the swing arm and a second pulley mounted adjacent the first pulley, and wherein the means for transferring mechanical motion comprises a cable having an upper end which is connected to the electrical position sensor and a lower end which is affixed to the shaft, the cable additionally being looped around the second pulley and engaging the first pulley.

15. The position sensing mechanism of claim 14, wherein the electrical position sensor comprises switch means for detecting displacement of the cable.

16. The position sensing mechanism of claim 1, wherein the guide means comprises a pair of tracks, and wherein the feeler mechanism comprises a mounting element affixed to one of the tracks, a swing arm pivotably mounted on the mounting element, and a member extending from the swing arm to engage the cart.

17. The position sensing mechanism of claim 16, wherein the anchor element comprises a first pulley fixedly mounted on the upender means, wherein the feeler member further comprises a second pulley mounted on the swing arm, wherein the means for transferring mechanical motion comprises a cable having an upper end which is connected to the electrical position sensor and a lower end which is affixed to the first pulley, the cable additionally being looped around the second pulley, and wherein the electrical position sensor comprises means for sensing movement of the cable.

18. The position sensor of claim 17, further comprising means spliced into the cable for keeping the length thereof substantially constant despite temperature variations.

19. The position sensor of claim 18, wherein the path extends through a tunnel having one end that is adjacent a nuclear reactor vessel and having another end that is disposed at a nuclear fuel storage facility.

20. The position sensor of claim 16, wherein the path extends through a tunnel having one end that is adjacent a nuclear reactor vessel and having another end that is disposed at a nuclear fuel storage facility.

* * * * *